United States Patent Office 3,498,933
Patented Mar. 3, 1970

3,498,933
PROCESS FOR SEPARATING AND PURIFYING POLYEPOXIDES FROM THEIR SOLUTIONS IN HYDROCARBONS
Claude Fey, Villepreux, Jean Gaillard, Carrieres, Seine, and Jean-Pierre Wauquier, Le Vesinet, France, assignors to Institut Francais du Petrole des Carburants et Lubrifiants, Malmaison, Hauts-de-Seine, France
No Drawing. Filed Feb. 23, 1967, Ser. No. 617,841
Claims priority, application France, Mar. 4, 1966, 52,201; Dec. 22, 1966, 88,582
Int. Cl. C08g 23/04, 23/06
U.S. Cl. 260—2                    14 Claims

ABSTRACT OF THE DISCLOSURE

This process for isolating polyepoxides from their solutions in hydrocarbon solvents also containing catalyst residues consists essentially of contacting these solutions with aqueous methanol of 40–90% by volume concentration to precipitate out the polyepoxides. Preferably a complexing agent is also used and the isolated polyepoxide is washed with a low molecular weight alcohol.

---

The process of this invention relates to a substantially quantitative separation of a phase having a high content of high molecular weight polyepoxide and the separation of said polymer from its solutions in hydocarbons. It also relates to a process for separating a polyepoxide with a very low content in catalyst metal residues.

The separation of polyepoxide from the raw product of an epoxide polymerization in solution is very difficult, particularly when the formed polymer is soluble in the solution. According to the prior art there were mainly used the two following methods:

The first method wherein the solvent is withdrawn either by heating or evaporation or by carrying away with steam. This method suffers from the drawbacks of requiring a relatively important apparatus, a high thermal energy and of being lengthy, The second method wherein there is used a non-solvent. The corresponding addition of liquid in large amounts (of the order of from 5 to 10 times the amount of the treated solution) results in the precipitation of the polymer which only needs to be filtrated and washed thereafter. It is obvious that the handling of such a large amount of liquid is difficult.

The process according to the present invention avoids these drawbacks since

It does not require an important apparatus

It does not result in a high thermal expanse since it can be conducted at the ambient temperature It provides for a substantially instantaneous separation of the polymer It makes use of only very small amounts of additional liquids.

Moreover this new process makes possible to obtain selectively polymers of high molecular weight; the low molecular weight byproducts remain in solution and may be separated by the conventional fractionating methods, either in view of their admixture in the desired proportion with the high molecular weight polymers or in view of any independent use.

It is well known that most of the polymerization reactions are catalyzed by metal compounds, which results in the presence in the polymer of metal residues. Such metal residues have a detrimental effect and generally result in the deterioration of the polymer during subsequent treatments such as moulding, and also cause the polymer to become yellowish and the metallic parts in contact with the molten polymer to become corroded.

It thus appears as of special interest to remove these residues, at least to the extent they are responsible of the above mentioned inconveniences.

Various processes have been proposed previously in order to achieve this purification of alklyene oxide polymers. These processes generally consisted of contacting the polymer solution with an aqueous solution containing an acid such as hydrochloric acid, citric acid, or ethylenediamino-tetracetic acid so as to extract the catalyst residues.

Such a liquid extraction is achievable but suffers from major drawbacks. It has been observed, as a matter of fact, that the contact times required to achieve this result are very long; frequently stable emulsions of polymers are formed particularly when ethylenediamino-tetracetic acid is used whereas with hydrochloric solutions a deterioration of the polymer is to be observed.

It is an object of this invention to provide a process which does not suffer from the above mentioned drawbacks. This process provides means for purifying and demineralizing the polymer much more rapidly than according to the prior art and requires only reasonable amount of liquids, while having no detrimental effect on the polymer.

The process of separating the polymer, according to this invention consists of adding to the raw liquid product of the polymerization of one or several epoxides in a hydrocarbon solvent, an aqueous solution of methanol having a methanol content of from 40 to 90% (preferably between 70 and 80%) by volume. The solid polymer is then separated from the liquid phase. The amount of methanol contained in the methanol solution will preferably correspond to 5 to 100% by volume of the treated polymer solution and more advantageously to 5 to 20% of said volume (these last mentioned values resulting in the maximal yields of precipitation).

The concentration of the methanol solution is critical. In fact with a concentration higher than 90% the polymer precipitates in an expanded form, is sticky and difficult to manipulate. With a concentration lower than 40% the precipitation is incomplete or even does not occur at all.

The process is particularly applicable to solutions in hydrocarbons of polymers and/or of copolymers at a concentration in the range of from 5 to 250 grams per liter, more particularly at a concentration between 30 and 70 grams per liter. The process is specially applicable to solutions of polymers and/or copolymers in saturated (aliphatic, cyclic) or aromatic hydrocarbons. As specific examples are to be mentioned pentane, hexane, heptane, isobutane, octane, cyclohexane, benzene, toluene, xylenes and petroleum cuts containing these hydrocarbons.

However the preferred hydrocarbons are the aliphatic saturated hydrocarbons containing from 4 to 12 carbon atoms in their molecule or mixtures thereof, in view of the fact that such solvents provide for a specially high rate of precipitation.

The temperature during the treatment will be comprised between $-20°$ C. and $+120°$ C. but preferably within the range of from $0°$ to $50°$ C. although such limits are by no way necessary.

If it is desired to obtain a still purer polymer, specially with a very low content in catalyst metal residues, the above-described step of precipitating the polymer will be combined with two other steps so as to conduct the process in three steps the two first of which can be simultaneous.

During a first step there is added to the raw product of polymerization a complexing or deactivating agent; in the second step the above mentioned treatment of precipitating with an aqueous solution of methanol is carried out; and finally in a third step the polymer is washed with an alcohol of low molecular weight preferably in aqueous solution.

For a definition and a listing of complexing substances one can refer for instance to the book entitled "Solvent Extraction in Analytical Chemistry" by George H. Morrison and Henry Freiser published by John Wiley and Sons, New York 1957, more particularly pages 16–34 and 157–247, although the present invention is not to be limited to the use of the particular complexing agents mentioned in this book.

Amongst such substances a preference is given to organic compounds having at least two functional groups as defined hereinafter, in position $\beta$ with respect to each other, these groups having the property of complexing the polymerization catalysts.

These functional groups can be the following:

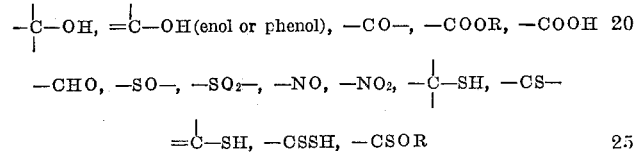

or the like, R being a monovalent hydrocarbon radical.

As examples of substances capable of complexing the polymerization catalysts, there may be mentioned those of the following non-limitative list:

$\beta$-Diketones such as trifluoroacetylacetone, benzoylacetone, furoylacetone, thenoyltrifluoroacetone, dibenzoylmethane, 3-methyl 2,4-pentane dione, and preferably acetylacetone; $\beta$-ketoacids such as acetylacetic acid, $\beta$-ketoesters such as ethyl acetylacetate; $\beta$-ketoaldehydes such as formylacetone, $\beta$-hydroxyketones such as orthohydroxylacetophenone, $\beta$-hydroxylaldehydes such as salicylic aldehyde; $\beta$-hydroxyesters such as ethyl salicylate; $\beta$-dicarboxylic acids and their esters such as malonic acid or ethyl malonate; $\beta$-dialdehydes such as malonic aldehyde, $\beta$-nitrated compounds such as 2-nitro acetic acid or nitrosoacetone; $\beta$-sulfurated compounds such as acetylthioacetic acid, ethyl thioacetylacetate, orthothioacetophenone or methyl $\beta$-thiopropionate. These substances will advantageously contain 3 to 30 carbon atoms, preferably from 3 to 12.

The deactivating substance may be introduced in the reaction medium either as such or in the form of its solution in an inert solvent (with respect to the polymer) such as a linear or cyclic saturated hydrocarbon or an aromatic hydrocarbon. As examples there may be named hexane, cyclohexane, n-heptane, benzene, toluene, xylenes.

The complexing temperature is usually comprised between $-20$ and $+120°$ C.

Amongst the complexing agents giving complexes with the considered metals, there are preferred those which exhibit a sharing coefficient, between the aqueous-alcoholic phase of precipitation and the organic phase, which is higher than 10:1 and preferably higher than 30:1; the complexing agents having preferably a solubility in heptane which is higher than 0.1% by weight.

The complexing agents which are preferred as being the most efficient are acetylacetone and lower alkyl acetoacetates (with an alkyl group having preferably from 1 to 4 carbon atoms).

The non-solvent liquid used in the course of the second step consists of an aqueous solution of methanol with a methanol content of 40–90% by volume, preferably 70–80%.

The amounts of pure methanol required have been mentioned above: 5 to 100% by volume with respect to the raw polymerization product. However when it is desired to effect a severe demineralization of the polymer, amounts of 20 to 50% are preferred.

The last step of the process (Step 3) consists of washing the polymer with a washing liquid which is inert with respect to the polymer and dissolves the complex formed during the first step.

There may be used alcohols of low molecular weight (particularly saturated or ethylenic aliphatic alcohols containing from 1 to 4 carbon atoms) or mixtures of the same with water.

By way of examples are to be mentioned ethylic, propylic, isopropylic and butylic alcohols, although an aqueous solution of methanol is preferred.

In the last case there will be used preferably methanol-water solutions having a methanol content of from 30 to 60%, e.g. 50%, by volume, in an amount at least equal to the weight of the polymer.

Preferably the washing will be repeated several times.

Only the carrying out of the process in 3 steps (1, 2, 3) as heretofore described makes it possible to reduce the ash content of polyepoxides down to proportions lower than 0.1% by weight and in most cases lower than 0.05%. In fact, as it will be apparent from the examples below, any change, for instance in the nature of the deactivating substance (said substance being no longer of the above defined type of complexing substance) or in the nature or concentration of the precipitation or washing liquids, will render impossible t oachieve a high purification of the polymer without substantial deterioration thereof as it is possible according to the invention.

By ashes there is meant the mineral compounds, essentially in the form of metal oxides, which remain after complete combustion of the polymer.

The process of the invention has a very wide field of applicability; it may be applied specially to polymer solutions obtained by contacting alkylene oxides with catalytic systems containing compounds of polyvalent metals and formed, for example, from trivalent and divalent metals in combination. Such catalytic systems have been described in the French patent application of Ser. No. 16,167 filed in the name of the applicant for the present invention, on May 6, 1965.

According to this patent application the preferred trivalent metal is aluminum and the divalent metal is selected from the groups I, II and IV to VIII of the periodic classification of elements. Other catalysts are described in the Belgian Patent 676,600.

The polymerizations may be conducted in saturated or aromatic hydrocarbons as solvents for the monomer, as hereabove described or simply in a monomer excess.

It must be understood that this invention is not limited to the polymers obtained by use of the catalytic systems escribed in said patent application. In fact the process of this invention may be used for demineralizing polymers which contain one or more metallic compounds of any kind, which are responsible for the polymerization.

As examples of metals which may enter in the composition of polymerization catalysts, there may be mentioned copper, calcium, barium, zinc, cadmium, aluminum, scandium, titanium. cobalt, iron, tin, vanadium, molybdenum, manganese, nickel, rhodium, ruthenium and platinum, and as other elements bismuth, antimony and arsenic.

Amongst the epoxides are specially to be mentioned the polymer subjected to a demineralizing treatment according to this invention are to be mentioned those having a ring of 3 or 4 carbon atoms, i.e. essentially 1,2-epoxides and 1,3-epoxides (oxetanes or oxacyclobutanes).

These compounds generally contain from 2 to 20 and preferably from 3 to 12 carbon atoms in their molecule.

Amongst the epoxides are specially to be mentioned those which conform to the general formula:

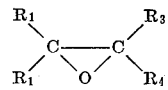

wherein radicals $R_1$ to $R_4$ represent hydrogen atoms and/or hydrocarbon radicals optionally substituted by atoms or radicals which do not impair the polymerization. Are more particularly to be quoted the alkyl, cycloalkyl, aryl, alkenyl and haloalkyl radicals.

Amongst the 1,2-epoxides there may be mentioned the following compounds: epoxyethane, epoxypropane, 1,2 - epoxybutane, 2,3 - epoxybutane, epoxyisobutane, epichlorhydrine, styrene oxide, m. chlorostyrene oxide, α-methylstyrene oxide, cyclohexene oxide, phenylglycidyl ether, chlorophenylglycidyl ethers, methoxyphenylglycidyl ethers, methylglycidyl ether, allylglycidyl ether, butadiene monoxide, dicyclopentadiene monoxide, cyclooctadiene monoxide, isooctene oxide, vinylcyclohexene monoxide.

Amongst the oxetanes the following examples are given more particularly: 3,3 - bis(chloromethyl) - oxacyclobutane, 1,3-epoxypropane, 2-methyloxetane, 3,3-bis(cyanomethyl) oxetane, 3,3 - diethyl-oxetane, 3 - methyl-3-propyloxetane, 3-ethyl-3-butyl oxetane, and the like.

The various monomers hereabove mentioned may be used either as such or in mixtures. Specially a copolymerization of two, three or four monomers or even more, may be carried out in order to obtain copolymers exhibiting special properties.

The specific action of the complexing agent on the catalytic system cannot yet be fully explained. It would seem however that M and M' being respectively the trivalent and divalent metals of the catalytic system (in the case of use of the catalytic system according to the above-mentioned patent application No. 16,167) and D being the molecule of the complexing substance, complexes are formed which would correspond to formulae $D_3M$ and $D_2M'$.

In the following the term stoichiometrical amount will represent the theoretical amount of complexing substance required to completely convert the metal or metals of the catalytic system to complexes. It will be the minimum of what is used in practical operation ($n$ molecules of complexing substance per atom of metal having a valence $n$).

It has been observed however, that an improvement in the demineralization of the polymer is obtained by the use of an excess of deactivating agent with respect to the stoichiometrical amount, for instance of 1.5 to 3 times said amount.

Of course larger amounts could still be used and for instance as much as 50 times the stoichiometrical amount but without improving the purification of the polymer.

The temperature at which precipitation of the polymer by the non-solvent takes place is not critical; it is generally lower than 50° C. and preferably close to the ambient temperature.

The following examples are given for illustrative purpose and are therefore not intended to limit in any way the scope of the invention.

EXAMPLE 1

140 grams of a solution in heptane of copolymer epoxypropane-allylglycidylether at a concentration of 45 grams per liter (i.e. 200 cc.) are precipitated by 30 cc. of diluted methanol having a 75% by volume methanol content, at a temperature of 25° C.

The yield in high molecular weight polymer is of 72% with an intrinsic viscosity of 7 dl./g. in toluene at 30° C. which corresponds to an estimated molecular weight of about 500,000. The polymer remaining in the solution exhibits a molecular weight lower than 1,000.

EXAMPLE 2

In a reaction vessel of stainless steel with a capacity of 20 liters are heated for 5 hours at 50° C., 1,062 grams of epoxypropane, 30 grams of allylglycidylether and 11 liters of heptane together with the catalytic system based on aluminum and zinc (a total of 640 milliatoms of metal) as described in the Belgium Patent No. 676,600. The reaction is stopped by addition of 640 millimoles of isopropylamine.

A first part of the outflow (3,940 grams) is treated by distillation of the solvent, giving 385 g. of dry copolymer (I) containing 3.94% by weight of units generated by allylglycidylether.

The second part, amounting to 5,160 grams is treated by the process of the invention by adding thereto at 35° C. a mixture of 750 cc. of methanol with 250 cc. of water.

The so precipitated polymer (II) weighing 428 grams contains 4.07% by weight of units generated by allylglycidyl ether, i.e. substantially the same content as that of the first part.

The Mooney viscosity (regulation ASTM-D 1646-63) is of 35 ML 1+4 at 100° C. for the copolymer of the first part (non-precipitated) and of 45 ML 1+4 at the same temperature for the second part.

With each of the co-polymers, there is prepared the following mixture:

| | Parts by weight |
|---|---|
| Copolymer | 100 |
| Zinc oxide | 4 |
| Stearic acid | 1 |
| Sulfur | 1.5 |
| Mercaptobenzothiazole | 0.5 |
| Tetramethylthiuram disulfide | 0.75 |
| Selenium dimethyldithiocarbamate | 1 |
| Nickel dibutyl dithiocarbamate | 1 |

This mixture is then vulcanized for 40 minutes at 150° C. and the following performances are observed:

| | Precipitated copolymer | Non-precipitated copolymer |
|---|---|---|
| Ultimate tensile strength kg./cm.² ASTM-D 412 | 176 | 133 |
| Ultimate elongation, percent, ASTM-D 412 | 850 | 850 |
| 300% modulus (ASTM-D 412) kg./cm.² | 22 | 14 |
| Bound rubber, percent | 89 | 78 |
| Hardness DiDC-IHRD ASTM-D 1415 | 63 | 54 |

EXAMPLE 3

140 cc. of epoxypropane are polymerized in 1,822 cc. of n-heptane for 5 hours at 50° C. in the presence of a catalytic system based on aluminum and zinc. The catalyst contains 80 milliatoms of aluminum and 40 milliatoms of zinc.

To the reaction medium are then added 500 millimoles of acetylacetone in order to stop the reaction.

The stoichiometry corresponds to 80×3+40×2=320 millimoles of acetylacetone as compared to the amount of 500 millmoles actually used which is therefore in large excess.

The polymer is precipitated from its solution in heptane by addition of 300 cc. of an aqueous solution of methanol (with a 75% by volume methanol content) at a temperature of 35° C.

After two washings of the precipitate with a solution by equal volumes of water and methanol, using 1 liter of solution per 100 grams of precipitate, there are obtained 64 grams of polyepoxide having $Al_2O_3$ and ZnO contents respectively of 0.04% and 0.02% by weight.

EXAMPLE 3A 280 cc. of epoxypropane, in solution into 1,720 cc. of n-heptane, are polymerized in the presence of a catalytic system based on aluminum and zinc and containing 38 milliatoms of aluminum and 19 milliatoms of zinc. The polymerization is continued for 5 hours at 70° C.

The polymerization process is stopped by addition of 250 millimoles of acetylacetone (whereas the stoichiometrical amount is of 152 millimoles).

The polyepoxypropane is precipitated by addition of 300 cc. of an aqueous solution of methanol with a 75% methanol content by volume at 35° C.

The precipitate, washed as according to Example 3, with a solution at equal volumes of water and methanol amounts to 140 g. and exhibits a content in oxidized ashes ($Al_2O_3+ZnO$) of 0.05% by weight.

An identical test wherein the aqueous solution used for the washing contained 75% by volume of methanol, everything else being the same, did not provide more than 125 grams of polyepoxypropane with the same ash content of 0.05%.

These comparative experiments prove that the methanol content of the washing solution must not exceed 60% in order to avoid that a part of the polymer be dissolved again. On the contrary the efficiency of the demineralization is not reduced.

EXAMPLE 3B

Example 3A is repeated except that the polymerization is stopped by injection of 60 millimoles of isopropylamine in the reaction medium. This is checked by observing the vapor pressure prevailing inside the reaction vessel. This pressure is equal to the sum of the respective partial pressures of the solvent (heptane in the present case) and of the monomer (epoxypropane). The total pressure decreases in proportion to the degree of advancement of the reaction, as a result of the monomer consumption. After the injection of isopropylamine the vapor pressure above the liquid phase does not change any longer.

The polyepoxypropane is precipitated and washed as according to Example 3A. There are thus obtained 134 grams of dry polymer. However the analysis of the filtrate after precipitation and of the washing solution shows that the resulting polymer still contains the almost entirety of the metals of the catalytic system. This comparative example illustrates the importance of the selection of a convenient deactivating agent.

EXAMPLE 3C

Example 3B is repeated except that isopropylamine is replaced by 100 millimoles of water. As in Example 3B the polymer still contains almost the entire amount of the metals of the catalytic system.

EXAMPLE 3D

Example 3A is repeated except that the polymerization is stopped by addition of 120 millimoles of acetylacetone, everything else being otherwise unchanged. The stoichiometrical amount is of 152 millimoles. As in Example 3 the actual stopping of the polymerization reaction is checked by measuring the vapor pressure.

The precipitation of the polymer and the washing are carried out under the same conditions as according to Example 3A. There are obtained 130 grams of polymer with an ash content which remains higher than 1.2%.

This example makes clear the criticality of the amount of deactivating agent to be used in accordance with the principle of the invention.

The use of an amount lower than the stoichiometrical one, even if it is sufficient to stop the polymerization reaction, does not result in a good demineralization of the polymer.

EXAMPLE 3E

By way of comparison with Example 3, if, in the washing step, the solution by equal volumes, of methanol in water is replaced by the same volume of n-heptane saturated by methanol, the ash content of the polymer amounts to 1.9% (1.2% of $Al_2O_3$ and 0.7% of ZnO).

EXAMPLE 4

1.7 liters of propylene oxide are copolymerized with 30 cc. of allylglycidylether in 10 liters of n-heptane. The copolymerization is conducted at 70° C. for 5 hours.

The catalytic system contains 242 milliatoms of aluminum and 115 milliatoms of zinc. The polymerization reaction is stopped by injection at 70° C. of 1.5 moles of acetylacetone, which corresponds to an excess of about 50% with respect to the stoichiometric amount.

After cooling at 35° C., there are introduced 2,500 cc. of an aqueous solution of methanol with a 75% by volume methanol content. After washing of the precipitate with a solution by equal volumes of water and methanol there are recovered 912 grams of copolymer having a content in oxidized ashes of 0.03% by weight (sum of $Al_2O_3+ZnO$).

The allylglycidylether used, even in very small amounts with respect to the propylene oxide, makes the polymer vulcanizable.

EXAMPLE 5

A catalyst is prepared by adding 3.08 grams of diethylzinc to a dispersion of 0.45 gram of water into 156 cc. of benzene. This catalyst is used for copolymerizing 27.5 grams of propylene oxide with 2.9 grams of allylglycidylether.

The reaction is stopped by addition of 75 millimoles of ethyl acetoacetate.

The copolymer is precipitated by 40 cc. of a solution having a 75% by volume methanol content and the product is washed by an aqueous solution of methanol having a 50% by volume content in this alcohol.

The demineralized copolymer exhibits an ash content of only 0.06% by weight.

It must be understood that this invention is applicable in the same way to the raw product of polymerization of epoxides particularly epoxypropane, in the presence of other catalysts, specially the following catalysts:

diethyl zinc and traces of water
dipropyl cadmium and traces of methanol
diethyl beryllium and traces of methylvinylketone
partly hydrolyzed ferric acetate
partly hydrolyzed ferric alcoholate
partly hydrolyzed triethylaluminum
triisobutylaluminum and traces of acetylacetone
triethylaluminum and nickel, cobalt, manganese or iron acetylacetonate
zirconium octoate and triethylaluminum.

What is claimed as this invention is:

1. A process for separating and purifying polyepoxides from their solutions in hydrocarbons, characterized in that said solutions are brought in contact with a solution of methanol in water at a concentration of from 40 to 90% by volume of methanol and in that the solid polymer is separated from the liquid phase, said polyepoxides being polymers of epoxides selected from the group consisting of 1,2-epoxides of 2–20 carbon atoms and 1,3-epoxides of 3–20 carbon atoms.

2. A process according to claim 1, characterized in that the methanol content of the solution is of from 70% to 80%.

3. A process according to claim 1, characterized in that the aqueous solution of methanol is used in such an amount that the volume of pure methanol contained therein is of 5 to 100% the volume of the polymer solution.

4. A process according to claim 1, characterized in that it is conducted at a temperature of from −20° C. to +120° C.

5. A process according to claim 1, characterized in that it is conducted at a temperature in the range of from 0° C. to 50° C.

6. A process according to claim 1, characterized in that a polyepoxide solution is treated in a saturated aliphatic hydrocarbon containing from 4 to 12 carbon atoms in the molecule.

7. A process according to claim 1, wherein the polyepoxides were formed in the presence of a metal catalyst and during the step of contacting the polymer solution with an aqueous solution of methanol, a sufficient quantity of complexing agent is added to the solution of polymer in hydrocarbon to complex said metal catalyst to keep it in solution and, after said contacting step, the precipitated polymer is washed with a low molecular weight alcohol.

8. A process according to claim 7, wherein the low molecular weight alcohol is used in aqueous solution.

9. A process according to claim 7, wherein the low molecular weight alcohol is methanol used in the form of an aqueous solution at a concentration of 30 to 60% by volume.

10. A process according to claim 7, wherein the complexing agent is acetylacetone or an alkyl acetoacetate wherein the alkyl group contains from 1 to 4 carbon atoms.

11. A process according to claim 7, wherein the complexing agent is used at a temperature of from −20 to +120° C.

12. A process according to claim 7, wherein the washing is carried out with a saturated or ethylenic aliphatic alcohol containing from 1 to 4 carbon atoms.

13. A process according to claim 12, wherein the alcohol is methanol, used in the form of an aqueous solution at a concentration of 30 to 60% by volume.

14. A process according to claim 7 as applied to the product of polymerization or copolymerization of epoxypropane in the presence of a catalyst containing zinc and aluminum.

References Cited
UNITED STATES PATENTS 3,221,059 11/1965 Fukui et al.
3,385,800 5/1968 Furukawa et al.

WILLIAM H. SHORT, Primary Examiner

T. PERTILLA, Assistant Examiner

U.S. Cl. X.R.

260—47, 88.3